(12) United States Patent
Harnisch

(10) Patent No.: US 7,699,525 B2
(45) Date of Patent: Apr. 20, 2010

(54) SUPPORT ARRANGEMENT FOR A MACHINE PORTAL AND METHOD FOR MANUFACTURE OF SUCH A SUPPORT ARRANGEMENT

(75) Inventor: Gunter Harnisch, Koenigsbrueck (DE)

(73) Assignee: TRUMPF Sachsen GmbH, Neukirch (DE)

( * ) Notice: Subject to any disclaimer, the term of this patent is extended or adjusted under 35 U.S.C. 154(b) by 705 days.

(21) Appl. No.: 11/530,185

(22) Filed: Sep. 8, 2006

(65) Prior Publication Data

US 2007/0071579 A1 Mar. 29, 2007

Related U.S. Application Data

(63) Continuation of application No. PCT/EP2005/002348, filed on Mar. 5, 2005.

(30) Foreign Application Priority Data

Mar. 11, 2004 (DE) .................. 10 2004 011 877

(51) Int. Cl.
*F16C 29/06* (2006.01)
(52) U.S. Cl. .................. 384/59; 384/45; 29/898.03
(58) Field of Classification Search .......... 384/43–45, 384/50, 55, 59; 29/898.03
See application file for complete search history.

(56) References Cited

U.S. PATENT DOCUMENTS 4,699,521 A * 10/1987 Yokota .................. 384/59
5,328,269 A * 7/1994 Mutolo et al. ........... 29/898.03
5,357,819 A * 10/1994 Takei .................... 384/45
5,431,497 A * 7/1995 Nonaka .................. 384/45
6,227,336 B1 5/2001 Rudy
6,227,708 B1 * 5/2001 Rixen et al. ............. 384/45

FOREIGN PATENT DOCUMENTS

| DE | 34 00 017 | 8/1985 |
| DE | 43 21 969 | 2/1994 |
| DE | 29705152 | 8/1997 |
| DE | 19 630074 | 1/1998 |
| DE | 19 643518 | 1/1998 |
| DE | 19645467 | 5/1998 |
| DE | 19 958375 | 6/2001 |
| EP | 0 321 686 | 4/1988 |
| EP | 0 950 818 | 4/1999 |

* cited by examiner

*Primary Examiner*—Thomas R Hannon
(74) *Attorney, Agent, or Firm*—Fish & Richardson P.C.

(57) ABSTRACT

A support arrangement for a machine portal includes a lightweight support structure and a row of base segments supporting at least one guide rail of a linear drive on the support structure. Both the base segments and the guide rail exhibit different thermal expansion behavior from the support structure. The base segments are fixed at a distance from their edges by fixing screws to respective fastening members extending into the support structure. The base segments define at least one step on which they support the guide rail with a positive fit. The guide rail is fixed to the support structure by at least one expansion screw. The support arrangement maintains precise alignment of the guide rail while accommodating differing thermal expansions between the rail, base segments and support structure.

20 Claims, 1 Drawing Sheet

SUPPORT ARRANGEMENT FOR A MACHINE PORTAL AND METHOD FOR MANUFACTURE OF SUCH A SUPPORT ARRANGEMENT

RELATED APPLICATIONS

This application is a continuation of, and claims priority under 35 U.S.C. §120 to PCT/EP2005/002348, filed on Mar. 5, 2005, and designating the U.S., and claims priority under 35 U.S.C. §119 from German application DE 10 2004 011 877.9, filed Mar. 11, 2004. Both of these priority applications are hereby incorporated by reference in their entirety.

TECHNICAL FIELD

The invention relates to a support arrangement for a machine portal, particularly a portal having a linear drive secured to a lightweight support structure, and to a method for the manufacture of such a support arrangement.

BACKGROUND

DE 297 05 152 U1 discloses a machining centre having a portal of lightweight construction running on linear guides. This portal consists of a lightweight strut framework consisting of carbon fibre tubes connected by means of light metal couplers or of honeycomb material. The drive for the portal and the bearings for the linear guides are not described.

A synthetic resin framework as lightweight components is known from DE 43 21 969 A1. This plastics material framework comprises a grating part and surrounding this grating part a frame part of sandwich construction comprising a skin layer and a core layer.

Devices for transferring forces into composite fibre structures having a connection between two elements of incompatible materials, i.e. of materials having different thermal expansion, are described in DE 196 45 467 A1 and in DE 199 58 375 A1.

A support arrangement and a manufacturing method are known from DE 196 43 518 A1. In this publication, soft iron plates are adhesively secured to a lightweight base body as the magnetizable or magnetic regions of a linear drive. The lightweight base body is in the form of an elongate hollow body wholly or partially filled with a damping filling material, and comprises carbon fibre-reinforced plastics material. The effects of the difference in the expansion coefficients of the lightweight base body on the one hand and the soft-iron plates on the other hand are intended to be kept to a minimum by applying an extremely thin adhesive layer. The soft-iron plates may nevertheless shift on the lightweight body or become detached from the lightweight body under the effect of temperature fluctuations.

SUMMARY

One object of the present invention is to provide a machine support arrangement that helps to ensure a high dimensional stability of a guide device in the form of at least one guide rail, and to provide a method for the manufacture of such a support arrangement.

According to one aspect of the invention, a machine portal support arrangement includes a lightweight support structure, a row of base segments supported by the support structure, and an elongated guide rail secured to the base segments. The base segments are each secured to the support structure by at least one threaded fastener engaging a respective fastening member extending into the support structure. Each base segment defines a longitudinal step and is formed of a material exhibiting different thermal expansion behavior than the support structure. A guide rail is secured to the base segments, with a longitudinal side surface of the guide rail engaged against the longitudinal steps of the base segments with a positive fit, so as to laterally locate and maintain the straightness of the guide rail. The guide rail is fixed by at least one expansion screw to the support structure and likewise exhibits a different thermal expansion behavior than the support structure. Thus, straightness and lateral positioning of the guide rail is maintained while allowing for differences in longitudinal expansion of the guide rail, base segments and support structure.

A linear drive carriage may be supported on the guide rail and configured to support a machine load.

In various embodiments, the guide rails are positively and non-positively mounted on the lightweight support. On their long sides they are laterally supported against steps of base segments of the linear drive. Irrespective of this support, under the effect of temperature fluctuations the guide rails are able to change their length, measured in the longitudinal direction of the rails. The expansion screws that secure the guide rails to the associated lightweight support allow such a change in length. The straightness of the guide rails is thus ensured even when temperature fluctuations occur. The base segments are connected to the lightweight support by way of fastening members engaging the lightweight support. Fixing screws that are to be screwed into a fastening member and at the same time pass through the base segments at a distance from the edges thereof are provided for that purpose. In this manner, a permanent connection that is moreover capable of carrying load is produced between the lightweight support and the base segments. In particular, this connection is capable of dispersing the forces acting on the base segments when the linear drive is being operated.

The disclosed manufacturing method ensures a high-precision assembly of the guide rails of inventive support arrangements. In this respect it is particularly advantageous that the screw threads for the fixing screws of the base segments do not cut into the relevant fastening members, and that the through-bores for the fixing screws are not produced on the base segments until the base segments assume their final position on the lightweight support. For precise alignment of the guide rails, the steps of the base segments for the positive locking support of the guide rails are preferably not produced until after the base segments have been adhesively secured.

An especially effective positive connection between the base segments and the lightweight support is achieved when the fixing screws for fixing the base segments engage with a positive fit by means of a screw head both in the relevant base segments and in the relevant fastening members.

In view of the thermal expansion that occurs, it is advisable to arrange the fixing screws centrally on the base segments. The fixing screws are in this case able to form anchor points when dimensional changes of the base segments occasioned by temperature occur.

Advantageously, the steps serving for support of the guide rail(s) are provided at the edges of the base segments. If the guide rails are connected right through the base segments to the lightweight support, then the expansion screws for fixing the guide rails can be used to fix the base segments at the same time. A radial play between the shank of the expansion screws for fixing the guide rails and the relevant through-opening in the base segments allows movements of the expansion screws relative to the base segments especially in the longitudinal direction of the guide rails. Such movements of the expansion screws occur upon length changes in the guide rails resulting from changes in temperature.

In some embodiments box spars, preferably box spars having walls in the form of sandwich structures, are used as the lightweight support. Such lightweight supports are distinguished by a high stability combined at the same time with markedly low weight. Steel is preferred as the material for the fastening members engaging the lightweight support and for the base segments and for the guide rails. The fastening members engaging the lightweight support can be stepped.

In a preferred construction, the base segments are mounted on the lightweight support both by way of fixing screws and by means of an adhesive bond. For mounting, the base segments are fixed temporarily to the lightweight support by means of screws while the adhesive used to produce the adhesive joint is curing. The screws for temporary fixing of the base segments here pass through through-bores, through which expansion screws will later be screwed to fix the guide rails to the lightweight support.

The invention is explained in more detail hereafter with reference to a schematic representation of an exemplary embodiment. Other features, objects, and advantages of the invention will be apparent from the description and drawings, and from the claims.

DETAILED DESCRIPTION

Figure 1:
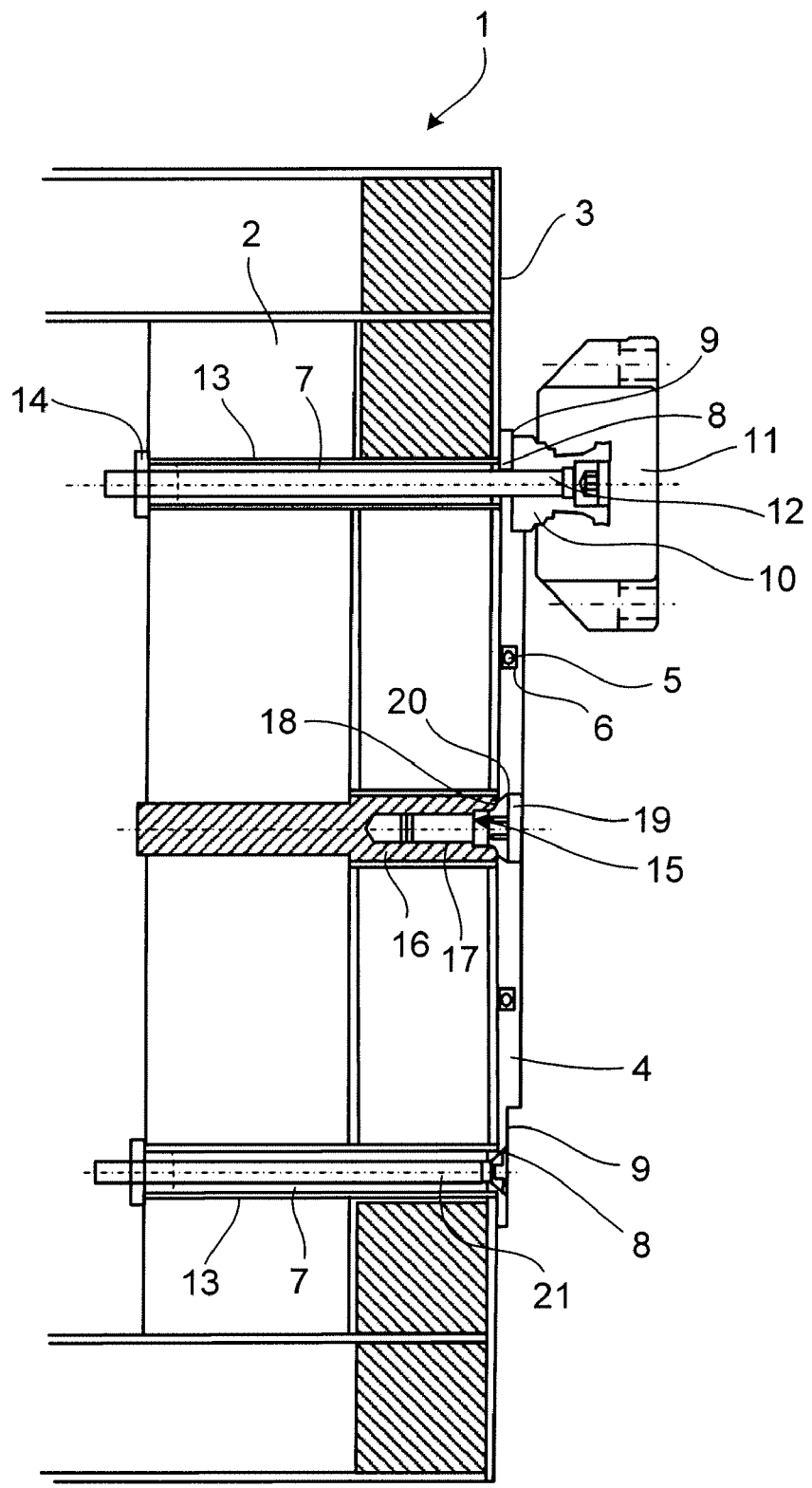
FIG. 1 is a schematic illustration of a machine portal support arrangement, in cross-sectional view.

Referring to FIG. 1, a support arrangement 1 is shown shortly before mounting thereof is complete. The support arrangement 1 is provided as part of a portal of a laser flatbed machine. It comprises a lightweight support 2, which is in the form of a box spar having walls in the form of sandwich structures. The sandwich structures comprise carbon fiberplastics (CFP) material face layers on the outside (CFP face layers) 3 and aluminum honeycomb material, not shown specifically.

Steel segments 4 are arranged in a line perpendicular to the drawing and are adhesively secured to the outer CFP face layer 3. These steel segments form base segments of a linear drive, not shown specifically. On their underside facing the lightweight support 2, the steel segments 4 are provided with grooves 5 that receive cooling pipes 6. Alternatively, the cooling pipes 6 can be arranged on the top side of the steel segments 4 and then be fixed, for example, by means of pipe clips. Bores 7 of the lightweight support 2 align with bores 8 at longitudinal edges of the steel segments 4 provided with steps 9.

A linear drive guide rail 10, likewise manufactured from steel, is supported on the steps 9 of the steel segments 4 uppermost in the drawing. The guide rail 10 supports a guide carriage 11, which can carry a machining head, in the example illustrated a laser machining head. Expansion screws 12, which pass through through-bores in the guide rail 10 and the bores 8 of the steel segments 4 and the bores 7 in the lightweight support 2, are used to fix the guide rail 10. The bores 7 in the lightweight support 2 are lined with CFP sleeves 13. The shanks of the expansion screws 12 extend with radial clearance in the CFP sleeves 13. There is also radial clearance between the shank of the expansion screws 12 and the wall of the bores 8 at the longitudinal edges of the steel segments 4. At the end of the CFP sleeves 13 remote from the guide rail 10, the expansion screws 12 are supported by a nut 14. Owing to the radial clearance between the shank of the expansion screws 12 and the CFP sleeves 13 and the wall of the bores 8 in the steel segments 4, the expansion screws 12 are able, for example, under the effect of temperature fluctuations, to move relative to the lightweight support 2. The nut 14 forms an abutment for the pivoting movement of the expansion screws 12.

Centrally between their longitudinal edges the steel segments 4 are connected by way of two steel fixing screws 15 to the lightweight support 2. Only one of the fixing screws 15 of the steel segment 4 illustrated is visible in the drawing.

The fixing screws 15 engage in stepped fastening members, which for their part are in the form of steel cores 16. The steel cores 16 are received by stepped bores of the lightweight support 2 and at the same time are pressed in the manner of a dowel through both the CFP face layers 3 and through the aluminum honeycomb structure of the lightweight support 2. CFP sleeve connectors, as described, for example, in DE 196 45 467 A1, are used to fix the steel cores 16 free from play to the lightweight support 2. The shank of the fixing screws 15 is screwed into a threaded bore 17 of the associated steel core 16. The threaded bores 17 are in the form of blind bores, and at their end towards the steel segments 4 graduate into a conical countersinking 18. The fixing screws 15 in the form of countersunk screws are supported with a positive fit at the conical countersinking 18 by means of a likewise conical screw head 19. There is furthermore a positive connection between the screw head 19 of the fixing screws 15 and the wall of through-bores 20 in the steel segments 4.

Below the steel core 16, a bore 7 in the lightweight support 2 and a bore 8 in the steel segment 4 are shown in the drawing, through which a countersunk screw 21 passes. Countersunk screws 21 serve to fix the steel segments 6 temporarily for the curing time of an adhesive between the lightweight support 2 and the steel segments 4. The bores 7, 8 receiving the countersunk screws 21 in the assembly phase illustrated are ultimately used to receive expansion screws 12 for fixing a further guide rail 10. The longitudinal edge of the steel segments 4 forming an abutment for the countersunk screws 21 is provided with a step 9 for positive support of the further guide rail 10.

To mount the support arrangement 1, first of all, after applying adhesive, blanks of the steel segments 4 are placed on the CFP face layer of the lightweight support 2. The blanks of the steel segments 4 are provided with through-bores, the diameter of which reduces close to the lightweight support 2 to form a tapered countersinking. Countersunk screws 21 are fixed through these through-bores to the lightweight support 2 and hence the blanks of the steel segments 4 are secured to the lightweight support 2 until the adhesive has cured. The conical screw head of the countersunk screws 21 screwed into the lightweight support 2 fits closely against the likewise conical wall of the bore 8 in the steel segments 4. In addition to providing an effective positive connection, this provides a tight seal with respect to the inside of the lightweight support 2. Ingress of, for example, coolant, lubricant or metal shavings into the inside of the lightweight support 2 is in this way prevented.

While the adhesive is still curing, the central countersunk through-bores 20 are produced in the steel segments 4, and the threaded bores 17 with the countersinkings 18 are formed in the steel core 16. The blind bore configuration of the threaded bores 17 prevents ingress of, for example coolant and/or metal shavings into the inside of the lightweight support 2.

One the fixing screws 15 have been screwed in and the adhesive has cured, with the countersunk screws 21 still screwed in the steps 9 are cut into the longitudinal edges of the steel segments 4. The region between the steps 9 is leveled by slight removal of material. The permanent magnets of the linear drive, which are not shown in the diagram for the sake of simplicity, are subsequently adhesively secured to the steel segments.

The countersunk screws 21 are subsequently removed and the guide rails 10 are placed on the steps 9 of the steel segments 4 and secured by means of expansion screws 13 to the lightweight support 2. The diagram shows the mounted state of the support arrangement 1 before the second guide rail 10 is applied.

It will be understood that various modifications may be made without departing from the spirit and scope of the invention. Accordingly, other embodiments are within the scope of the following claims.

What is claimed is:

1. A machine portal support arrangement comprising
   a lightweight support structure;
   multiple base segments aligned in a row and each secured to the support structure by at least one threaded fastener engaging a respective fastening member extending into the support structure, each base segment defining a longitudinal step and formed of a material exhibiting different thermal expansion behavior than the support structure; and
   a guide rail secured to the base segments with a longitudinal side surface of the guide rail engaged against the longitudinal steps of the base segments with a positive fit;
   wherein the guide rail is fixed by at least one expansion screw to the support structure and likewise exhibits a different thermal expansion behavior than the support structure.

2. The support arrangement of claim 1, wherein the threaded fastener has a head that engages both the respective base segment and the respective fastening member with a positive fit.

3. The support arrangement of claim 1, wherein the threaded fastener is arranged centrally with respect to two opposing lateral edges of the respective base segment.

4. The support arrangement of claim 1, wherein the longitudinal steps are defined along a longitudinal edge of each base segment.

5. The support arrangement of claim 1, wherein each expansion screw fixing the guide rail passes through a base segment with radial clearance.

6. The support arrangement of claim 1, wherein the expansion screw fixing the guide rail passes through a base segment at the longitudinal step.

7. The support arrangement of claim 1, wherein the support structure comprises a box spar.

8. The support arrangement of claim 1, wherein the at least one fastener member extending into the support structure is a piece of solid steel.

9. The support arrangement of claim 1, wherein at least one of the base segments is formed from steel.

10. The support arrangement of claim 1, wherein the guide rail is in the form of a steel rail.

11. The support arrangement of claim 1, wherein the at least one of the base segments is adhesively secured to the support structure; and
    wherein the adhesively secured base segments define bores configured to receive screws to secure the base segments to the support structure until the adhesive has cured, and then to receive the expansion screws for fixing the guide rail.

12. The support arrangement of claim 1, wherein the base segments each define two longitudinal steps extending along opposite longitudinal edges of the base segment.

13. The support arrangement of claim 12, comprising two guide rails, each guide rail supported on an associated step of each base segment.

14. The support arrangement of claim 1, wherein the support structure is of a sandwich construction.

15. The support arrangement of claim 14, wherein the support structure has outer layers of carbon fiber plastic and an aluminum honeycomb core.

16. The support arrangement of claim 1, wherein the fastener members are pressed into the support structure.

17. The support arrangement of claim 1, wherein the fastener members are spaced from edges of the base segments.

18. The support arrangement of claim 1, further comprising a linear drive carriage supported on the guide rail.

19. The support arrangement of claim 1, further comprising a cooling pipe disposed in a channel defined between the base segments and the supporting structure.

20. A method of manufacturing a support arrangement for a machine portal, comprising
    introducing fastening members into a support structure and securing the fastening members to the support structure;
    positioning base segments in a line over the fastening members such that the fastening members are spaced from the edges of the base segments;
    adhesively securing the positioned base members to the support structure;
    forming through-bores in the adhesively secured base segments and corresponding thread bores in the fastening members;
    screwing fixing screws through the through-bores in the base segments into the threaded bores in the fastening members to secure the base segments;
    forming steps at longitudinal edges of the base segments; and
    bringing a guide rail into engagement with the formed steps of the base segments; and
    securing the guide rail to the support structure by expansion screws.

* * * * *

UNITED STATES PATENT AND TRADEMARK OFFICE
CERTIFICATE OF CORRECTION

| | | |
|---|---|---|
| PATENT NO. | : 7,699,525 B2 | |
| APPLICATION NO. | : 11/530185 | |
| DATED | : April 20, 2010 | |
| INVENTOR(S) | : Harnisch | |

It is certified that error appears in the above-identified patent and that said Letters Patent is hereby corrected as shown below:

Column 6, claim 20, line 45, delete "thread" and insert --threaded--.

Signed and Sealed this
Nineteenth Day of April, 2011

David J. Kappos
*Director of the United States Patent and Trademark Office*